United States Patent [19]

Goto et al.

[11] 4,029,072

[45] June 14, 1977

[54] IGNITING APPARATUS FOR INTERNAL COMBUSTION ENGINES

[75] Inventors: Kenji Goto; Daisaku Sawada, both of Shizuoka, Japan

[73] Assignee: Toyota Jidosha Kogyo Kabushiki Kaisha, Toyota, Japan

[22] Filed: July 9, 1974

[21] Appl. No.: 487,212

[30] Foreign Application Priority Data

Aug. 27, 1973 Japan .................... 48-96016
Nov. 6, 1973 Japan .................... 48-124640

[52] U.S. Cl. .................... 123/191 S; 123/32 SP; 123/143 B; 123/148 E
[51] Int. Cl.² .................... F02B 23/00; F02P 23/00
[58] Field of Search ......... 123/32 ST, 32 SA, 32 K, 123/32 MS, 32 SP, 75 B, 148 E, 143 B, 191 S, 191 SP

[56] References Cited

UNITED STATES PATENTS

| | | | |
|---|---|---|---|
| 1,369,177 | 2/1921 | Kraft | 123/191 SP |
| 2,153,598 | 4/1939 | Steward | 123/143 B X |
| 2,276,966 | 3/1942 | Hansell | 123/148 P |
| 3,081,360 | 3/1963 | Kaehni | 123/191 S X |
| 3,280,809 | 10/1966 | Issler | 123/148 E |
| 3,406,667 | 10/1968 | Evans et al. | 123/32 ST |
| 3,776,212 | 12/1973 | Karlowitz | 123/191 SP |
| 3,788,293 | 1/1974 | Anderson | 123/148 CB |
| 3,809,042 | 5/1974 | Hosho et al. | 123/148 E X |
| 3,835,830 | 9/1974 | Shepherd | 123/148 E |
| 3,842,818 | 10/1974 | Cowell et al. | 123/191 S X |
| 3,842,819 | 10/1974 | Atkins et al. | 123/191 S X |
| 3,870,028 | 3/1975 | Ishida | 123/148 CB |

*Primary Examiner*—C. J. Husar
*Assistant Examiner*—David D. Reynolds
*Attorney, Agent, or Firm*—Karl W. Flocks

[57] ABSTRACT

An igniting apparatus for internal combustion engines comprises a central igniting electrode disposed at the position adjacent to an opening communicating, between an auxiliary combustion chamber and a main combustion chamber, an earthed electrode consisting of an inner circumferential portion in close to the opening and an electric source means supplying discharge voltage between both the electrodes, whereby lean mixture can be easily ignited and the electric source means has a sufficient discharge duration to energize the mixture and combustion gases passing said opening.

6 Claims, 7 Drawing Figures

IGNITING APPARATUS FOR INTERNAL COMBUSTION ENGINES

BACKGROUND OF THE INVENTION

The present invention relates to an igniting apparatus for internal combustion engines, which carrys out the ignition of air-fuel mixture with an electric arc discharge.

In an igniting apparatus igniting the mixture with the electric arc discharge according to the prior art, an ignition plug having an earthed electrode and a central electrode has been used, which ignition plug is mounted in the engine with both the electrodes being exposed into the combustion chamber to ignite and burn air-fuel mixture. In this arrangement, when the load on the engine is small i.e. the vacuum pressure in an intake manifold is high or the air-fuel ratio of mixture is large i.e. the mixture is lean, the ignitability is reduced.

In the usual internal combustion engine, in order to reduce the amounts of unburned hydrocarbon, carbon monoxide and nitrogen oxide included in exhaust gas, it is preferable to burn the mixture of the large air-fuel ratio i.e. the lean mixture. However, according to the prior ignition arrangement as described hereinbefore, the ignition for the mixture gas having a large air-fuel ratio is almost impossible.

An internal combustion engine comprising a main combustion chamber and an auxiliary combustion chamber provided with an ignition plug has been known. In this engine of the prior art, ignitable mixture i.e. mixture having an air-fuel ratio easily combustible is supplied to the auxiliary combustion chamber and ignited by the ignition plug, and then the ignition gas jets into the main combustion chamber from the auxiliary combustion chamber. The lean mixture in the main combustion chamber is burned by the ignited gas jetted thereto.

In the ignition system as described above, in order to produce within the auxiliary combustion chamber mixture different in an air-fuel ratio from mixture supplied to the main combustion chamber, it is necessary to separately provide an intake valve or a fuel injection valve in the auxiliary combustion chamber, so that the constructions of the fuel supply system of an engine may be complicated. Further, in this prior engine, there is such disadvantage that it is impossible to make the capacity of the auxiliary combustion chamber smaller than a certain value.

In usual internal combustion engine, the cause making wrong the ignitability of the lean mixture is as follows.

The arc discharge for the ignition generates concentratively at the spark gap defined by the central electrode and the earthed electrode in a combustion chamber and there is no turburent flow of the mixture at the position adjacent the spark gap of the ignition plug, so that even if the energy of the arc discharge is made high, part of the mixture to be activated by the arc discharge is a limited part existing nearly to the spark gap. These phenomena result that the probability of conduction of the energy for fuel particles is low and even if nuclei of flame generate the sizes of the nuclei do not reach a certain value and therefore, the desired energy for activating the fuel particles of mixture surrounding the nucleus of flame and extending the surface of the flame locks. As the energy of the nucleus of flame is unsufficient as above, the energy is absorbed by the fuel particles yet not burned existing nearly thereto and become extinct.

In general, an electromagnetic coil so called an ignition coil is used in order to generate the arc discharge. Such part of the air-fuel mixture as being under the influence of the arc discharge in the cylinders of engine is not ignited only but also activated by the arc discharge. This activation serves the acceleration of combustion of the mixture. Therefore, the energy of an electric arc discharge is influenced by the capacity of the ignition coil. An ignition coil being able to supply high energy is advantageous in relation to the ignition of mixture. An ignition coil according to the prior art only supply an electric energy of about 10–200 mJ and as the intencity of the electric current of arc discharge is restricted by the high impedance of the secondary coil of the ignition coil, the energy discharge level of arc discharge within a unit time is very low. It is impossible, within a certain limited period, to supply a sufficient energy to the mixture.

A main object of the present invention is to dissolve disadvantages due to the prior igniting apparatus as aforesaid and to provide a novel igniting apparatus being able to easily ignite lean mixture having a large air-fuel ratio.

An object of the present invention is to provide an igniting apparatus having an ignition electric source, of which the electric current of discharge is larger than that of the prior igniting apparatus, thereby a large energy can be supplied to the air-fuel mixture gas.

According to the present invention, an spark gap is provided at a communicating opening communicating the auxiliary combustion chamber to the main combustion chamber of the cylinder of engine and combustion gap passing through the communicating opening is energized extensively at high degree, so that the ignitability of an igniting apparatus can be improved.

Further, according to the present invention, the ignition effectiveness of an igniting apparatus can be sufficiently obtained, even if the capacity of an auxiliary combustion chamber is small in comparison with the usual engines. This matter possibly results that the auxiliary combustion chamber can be provided within an ignition plug without particularly providing an auxiliary combustion chamber in a cylinder head of an engine. If the ignition plug, as described above, having an auxiliary combustion chamber is used in the usual engine, the igniting apparatus according to the present invention could be applied to the usual engine.

In the igniting apparatus of the present invention, as aforesaid, mixture in an engine cylinder is effectively burnt by injecting combustion gas generated in an auxiliary combustion chamber into a main combustion chamber. Further, a spark gap is provided in the communicating opening or near thereto, so that the gas passing through said opening is activated (ionized) by the electro arc discharge. This activation increase the combustion efficiency and the velocity of the injecting gas into the main combustion chamber. In general, combustion gas i.e. burnt gas to be exhausted has a tendency of remaining within an auxiliary combustion chamber, so that the ignition for fresh mixture supplied into the auxiliary combustion chamber may be difficult. However, according to the present invention, as the spark gap is formed in the communicating opening or near thereto, even if the burnt gas (burnt material to be exhausted) remains in the innermost part of the auxiliary combustion chamber after completion of an exhaust stroke, new mixture gas to be ignited easily enters into the auxiliary combustion chamber through the communicating opening in a compression stroke and the new mixture gas is subjected to the electric arc discharge in the sprak gap. Therefore, the ignition for the mixture gas is very easy.

In usual internal combustion engines, when the engine is under the condition of an idling operation, starting operation or low loading operation, particularly when the engine is under such condition that the temperature of the engine is low, the combustion temperature of a lean mixture gas intaked into the cylinder is low and the propagation of flame of the combustion is poor. In the present invention, the electric discharge for igniting the mixture is carried out in or at the position near the communicating opening formed between the auxiliary combustion chamber and the main combustion chamber, so that the mixture gas passing through the communicating opening is able to obtain high energy from the electric discharge arc. In the gas supplied the high energy, the jet velocity of the combustion gas (burnt gas) jetting into the main combustion chamber through the communicating opening is high, so that a highly effective propagation of flame can be obtained. This results that even when the temperature of engine is low and the intaked mixture is lean, good combustion effects can be obtained.

In the igniting apparatus according to the present invention, the spark gap is provided within or adjacent to the communicating opening formed between the main and auxiliary combustion chambers. A lean mixture gas is sucked into the main combustion chamber. In a certain case, lean and uniform mixture is supplied in the main and auxiliary combustion chambers respectively.

In the actual embodiments of the present invention, the electric arc discharge is carried out successively from a certain time in a compression stroke or when the mixture is introduced into the auxiliary combustion chamber, the electric arc discharge is once carried out, and then, when the combustion gas generated by burning said introduced mixture in the auxiliary combustion chamber jets into the main combustion chamber, a further electric arc discharge is once generated.

As described above, according to the present invention, as even a lean mixture gas can be easily burnt, an engine can be operated by the lean mixture. If the lean mixture is used for an engine, nitrogen oxide, hydrocarbon and carbon monoxide included in an exhaust gas (combustion gas) are decreased in comparison with the case of use of a rich mixture gas. Further, according to the igniting apparatus of the present invention, even if a vacuum pressure in an intake manifold is high, an effective ignition can be obtained. This results that the engine stall phenomena under low loading condition is prevented.

An igniting electric source apparatus of the igniting apparatus aforementioned, according to the present invention, comprises a high voltage electric source device and a low voltage electric source device. The high voltage electric source device causes an ignition plug to carry out an initial arc discharge. The low voltage electric source device discharges an electric charge stored in a capacitor by being induced by the initial arc discharge due to the high voltage electric source device. The electric charge stored in the capacitor is given to the ignition plug (spark plug) by the discharge of the capacitor. This discharge current due to the low voltage electric source device is relatively large. The electric arc discharge also in the ignition plug can be maintained for a long time in comparison with that in a prior igniting electric apparatus for the electric arc discharge. In the prior igniting electric apparatus, only an instantaneous high voltage discharge (corresponding to the initial arc discharge in the present invention) is generated in the ignition plug.

In the present invention, a high voltage electric power from the high voltage electric source device and a low voltage electric power (This voltage is of low in comparison with the high voltage supplied from the high voltage electric source device.) from the low voltage electric source device are supplied to the spark gap successively. A contact breaker and an electromagnetic induction coil, as well known, are employed for the high voltage electric source device, while the circuit having particular constructions of the present invention is used for the low voltage electric source device. These electric source devices are connected to the spark gap in parallel. In a practical circuit construction, rectifiers are provided in the respective circuits for preventing current leakage between these circuits.

The electric power supplied from the low voltage electric source device should be supplied to the electric discharge electrode of spark gap immediately after the initial electric discharge was developed in the spark gap by the high voltage electric source device to form an electric discharge path. For this purpose a capacitor and a resistor deciding the time constant of the condenser are connected to the electric source in the low voltage electric source device. Therefore, the electric power from the low electric source device is stored temporarily into the capacitor and this stored electric energy is discharged immediately after the initial electric discharge, so that the continuous discharge generates between the electric discharge electrodes of spark gap.

In the present invention, as aforesaid, the continuous discharge of low voltage is carried out at the spark gap following the electric discharge of high voltage. This effect is very useful for igniting the air-fuel mixture in a internal combustion engine, because in the ignition of the air-fuel mixture, the more the energy given from the electric arc discharge to the air-fuel mixture is larger, the more advantages are obtained. When the energy given to the mixture is large, the mixture is activated by the said energy over large extent.

The igniting electric source apparatus, as aforesaid, is very effective for the internal combustion engine having the spark gap within or adjacent to the communicating opening formed between the main combustion chamber and the auxiliary combustion chamber. In such internal combustion engine, the mixture gas supplied to the auxiliary combustion chamber is ignited by the electric arc discharge generated at the spark gap and then the combustion gas produced by the said ignition jets into the main combustion chamber and ignites mixture gas already supplied to the main combustion chamber. In this case, if the electric arc discharge is continuously carried out for a time, it is possible not only to ignites the mixture but to give effectively the combustion gas large energy. Supplying of the large energy to the combustion gas develops good combustion of the mixture in the main combustion chamber.

Other and further objects, features and advantages of the present invention will appear from the following description referring to the accompanying Drawings.

DETAILED DESCRIPTION OF THE EMBODIMENTS OF THE INVENTION

Figure 1:
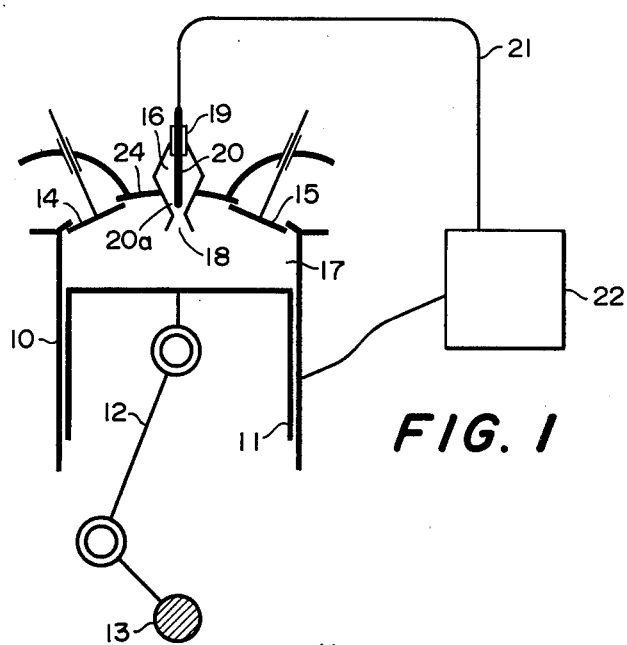
FIG. 1 is an explanatory view showing the igniting apparatus of the present invention combined to an internal combustion engine.

In FIG. 1, the applied embodiment of the present invention is shown as a schematic drawing. A piston 11 is disposed reciprocably within a cylinder 10 as usual and is connected with a crank shaft 13 through a connecting rod 12. Disposed in a cylinder head 24 are an intake valve 14 and an exhaust valve 15. An auxiliary combustion chamber 16 is formed at the central portion of the cylinder head 24. A communicating opening 18 connecting the auxiliary combustion chamber 16 to a main combustion chamber 17 in the cylinder 10 is formed in the auxiliary combustion chamber 16. An ignition (spark) plug 19 is mounted in the upper portion of the auxiliary combustion chamber 16, of which a central electrode 20 projects downwardly into the auxiliary combustion chamber. Thus, spark gap 20a is formed between the lower end portion of the central electrode 20 and the inner circumferential portion in close to the communicating opening 18. The central electrode 20 is connected to an igniting electric source apparatus 22 through a lead wire 21. An earth terminal of the apparatus 22 is connected to the wall of the cylinder 10.

The operation of the engine comprising the igniting apparatus of the present invention is as follows.

In the compression stroke of the piston 11, the volume of the main combustion chamber 17 is decreased in accordance with the displacement of the piston 11 in the compression stroke while the volume of the auxiliary combustion chamber 16 is not varied. As the volume of the auxiliary combustion chamber 16 is not varied in the compression stroke, an air-fuel mixture compressed in the main combustion chamber 17 by the piston 11 enters into the auxiliary combustion chamber 16 through the opening 18 from the main combustion chamber 17. Before the piston 11 reaches top dead center, i.e. slightly before the compression stroke finishes, a high voltage electric power is supplied to the ignition plug 19. By this high voltage electric power, the electric discharge arc generates between the central electrode 20 and the inner circumferential portion in close to the communicating opening 18 near the discharge gap 20a. The mixture being entering to the auxiliary combustion chamber 16 from the main combustion chamber 17 is supplied a high energy from the discharge arc and ignited. As the result of this ignition, the interior of the auxiliary combustion chamber 16 becomes a combustion condition. The combustion gas generated in the auxiliary combustion chamber 16 by the ignition is increased in the pressure by the combustion heat and jets into the main combustion chamber 17 through the communicating opening 18. The electric discharge as mentioned above is continuously carried out still in this time. However, in the other case the discharge operation is stopped at the time the ignition of the mixture entering into the auxiliary combustion chamber is ended and it is carried out again at the time the combustion gas jets into the main combustion chamber 17. Therefore, the combustion gas jetting through the communicating opening 18 is given the high energy by this discharge arc. This combustion jet gas having the high energy activates rapidly the mixture yet not ignited in the main combustion chamber 17 and cause it to burn in an instant. The electric discharge is stopped when the piston stroke changes from the compression to the expansion i.e. just after the combustion in the main combustion chamber 17 is completed.

Figure 2:
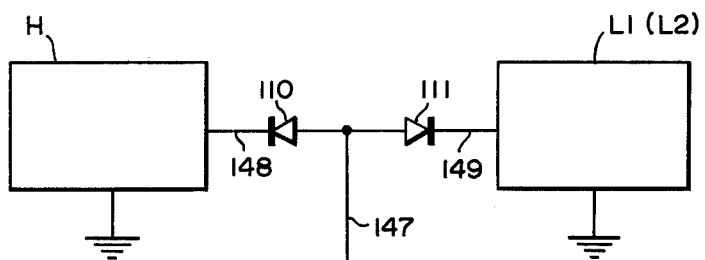
FIG. 2 is a vertical sectional view of one embodiment of the present invention, in which the electric devices are shown as a schematic view.
Figure 2:
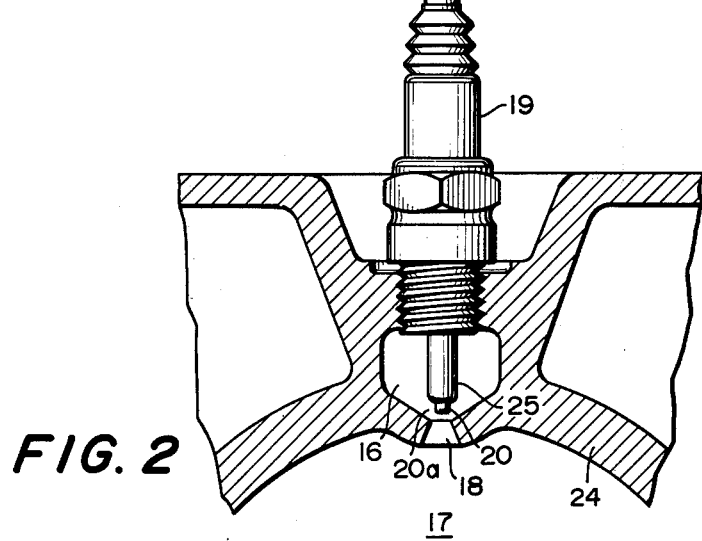

In FIG. 2, there is shown an actual embodiment of the auxiliary combustion chamber 16 provided with the ignition plug 19 shown in FIG. 1. In the embodiments, the auxiliary combustion chamber 16 is formed in the cylinder head 24, which is arranged at the position corresponding to each cylinder. Formed in the lower wall portion of the auxiliary combustion chamber 16 is the communicating opening 18. The opening 18 is narrow in the upper end and is broad in the lower end. As the inner diameter of the opening 18 is made large with the downward direction, the combustion jet gas expands towards the main combustion chamber 17.

The ignition plug 19 mounted on the upper wall of the auxiliary combustion chamber 16 has a particular construction according to the present invention. The ignition plug 19 comprises the central electrode 20 extending to the position in or adjacent to the communicating opening 18 in a vertical direction. The central electrode 20 is covered with a porcelain sheath 25 except the lower end portion to be insulated from the metallic portion threaded on the cylinder head 24. The electric discharge gap 20a is formed between the lower end portion of the central electrode and the circumferential portion of the upper end of the opening 18 in the bottom wall surface of the auxiliary combustion chamber 16. The central electrode 20 is connected to the high voltage electric source device H with a lead wires 147 and 148 through a rectifier 110. The earth terminal of the device H is connected to the wall portion of the cylinder head 24. The central electrode 20 is connected to the low voltage electric source device L1 or L2 through rectifier 111. The embodiments of the device L1 and L2 will be described hereafter.

During the compression stroke of the piston, the volume of the main combustion chamber 17 is reduced in accordance with the stroke but the volume of the auxiliary combustion chamber 16 is not changed, so that the mixture gas compressed by the piston may enter the auxiliary combustion chamber 16 from the main combustion chamber 17 through the communicating opening 18. Before the piston reaches the top dead center (i.e. just before the end of the compression stroke), at an adequate time, high voltage pulse is supplied to the ignition plug from the device H. By this high voltage pulse the spark discharge arc is generated at the discharge gap 20a.

According to the igniting electric source apparatus, the high voltage spark discharge is followed immediately by the low voltage electric discharge of the low voltage electric source device L1 or L2. The devices L1 and L2 are so constructed as to supply a direct electric current. The voltage of the direct electric current from the device L1 or L2 is lower than that of the high voltage electric source device H, while the voltage value of the current from the device L1 or L2 is high sufficiently to remain a discharge arc at the discharge gap 20a. As aforesaid, this low voltage current continues for a time, so that the combustion gas passing through the communicating opening 18 is given the high energy by the continuous discharge arc due to this current. The period of flowing of this current is defined by a capacitor and a resistor combined into the circuit of the device L1 or L2.

Figure 3:
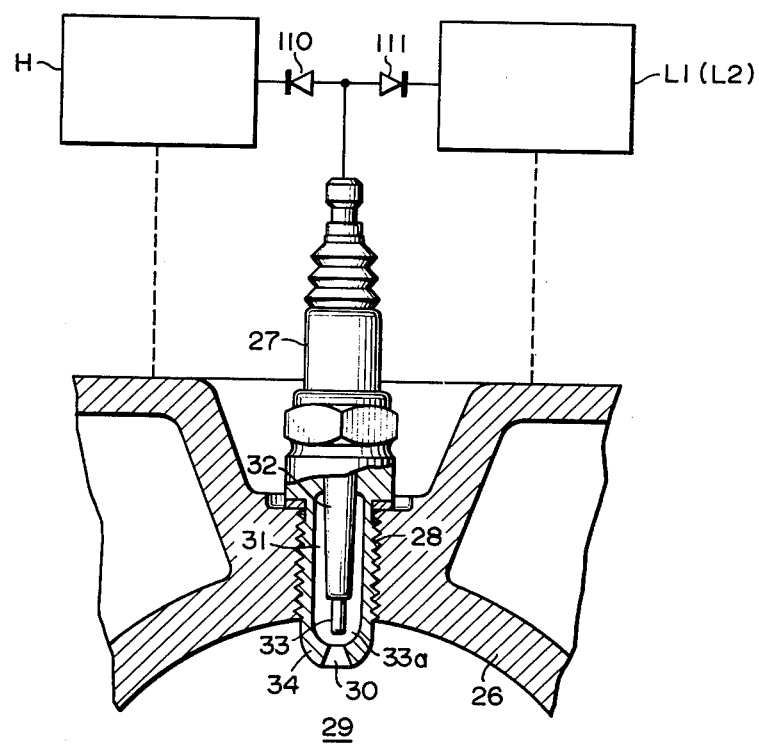
FIG. 3 is a vertical sectional view, as same as shown in FIG. 1, showing another embodiment of the present invention.

In FIG. 3, one embodiment of the present invention, wherein the auxiliary combustion chamber 31 is formed in an ignition plug 27 but the cylinder head does not need the auxiliary combustion chamber. Therefore, the igniting apparatus of the present invention is applied for an engine having no auxiliary combustion chamber by using the ignition plug 27 shown in FIG. 3, as well as the case of the engine having the auxiliary combustion chamber.

In FIG. 3, an ignition plug 27 is threaded to a cylinder head 26. The ignition plug 27 has a main part 28 made of a heat resistant and electric conductive material and the part 28 is threaded to the cylinder head. This material may be a usual material used for the ignition plug. The part 28 is formed in a hollow-shape and therefore, the hollow-shaped portion can provide an auxiliary combustion chamber 31. Formed in the lower end wall of the chamber 31 is a communicating opening 30 intercommunicating the auxiliary combustion chamber 31 and a main combustion chamber 29 each other. A central electrode 33 projects into the auxiliary combustion chamber 31, of which the lower end terminates at a position in or adjacent to the opening 30. The central electrode 33 is sheathed with an insulating sleeve 32 by which the central electrode 33 is insulated from the part 28. Between the lower end portion of the central electrode 33 and the peripheral surface area 34 of the opening 30, an electric discharge gap or spark gap 33a is formed. The central electrode 33 is connected to the high voltage electric source device H through a rectifier 110 and connected to the low voltage electric source device L1 or L2 (the direct current source) through a rectifier 111. The earth terminals of the devices H and L1 (L2) are connected to the cylinder head 26.

The operation and effect of the embodiment shown in FIG. 3 are quite same as those of the embodiment shown in FIG. 2.

In the present invention, it is desirable that the electric discharge operation of the ignition plug continues from a certain time in the compression stroke to a certain time in the combustion stroke i.e. to the expansion stroke. The devices H and L1 and L2 will be explained in the following description.

Figure 4:
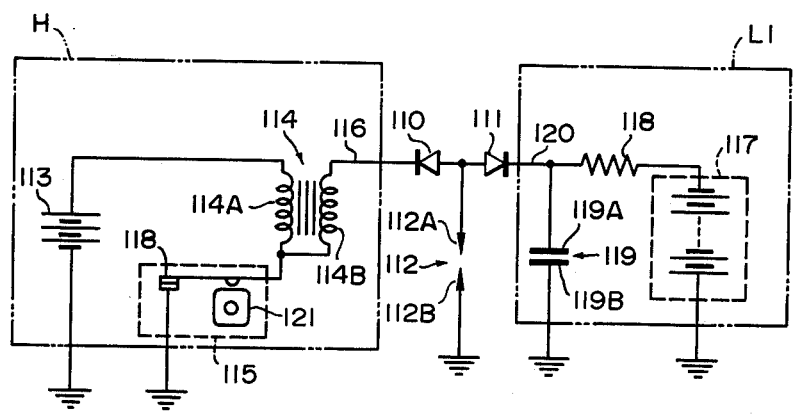
FIG. 4 is an electric circuit diagram showing an embodiment of the igniting electric source apparatus of the present invention.

In FIG. 4, the high voltage electric source device H and the low voltage electric source device L1 are connected in parallel to a spark gap 112 with each other through the rectifiers 110 and 111 which are arranged in the reverse direction to each other. As so, the rectifiers 110 and 111 are connected in series and in reverse direction to each other, so that electric leakages between the devices H and L1 can be prevented.

In the high voltage electric source device H, a battery 113, such as a secondary cell, a primary winding 114A of ignition coil 114 and a contact breaker 115 are connected in series. The positive electrode of the battery 113 and a stationary member of the contact point 118 of the contact breaker 115 are earthed. In the ignition coil 114, a secondary winding 114B is connected to the primary winding 114A in series. An output lead 116 of the secondary winding 114B is connected to one electrode 112A of the ignition plug through the rectifier 110 in series. The electrode 112A forms the spark gap 112 in cooperation with the other electrode 112B being earthed.

The low voltage electric source device L1 comprises a battery 117 as an electric source for supplying a direct current of low voltage e.g. 50V–1,500V. In this device L1, the negative electrode of the battery 117, a resistor 118 and a condenser 119 are connected in series. The positive electrode of the battery 117 is earthed and also one electrode 119B of the capacitor 119 are earthed. The other electrode 119A of the capacitor 119 is connected to an output lead 120 of the device L1. The lead 120 is connected to the discharge electrode 112A through the rectifier 111 in series.

A cam 121 of the contact breaker 115 is operatively connected to the engine in a usual manner, thereby the contact points 118 of the contact breaker 115 are actuated to make the contact members operate intermittently. When the contact points are opened, an electric current flowing in the primary winding 114A of the ignition coil 114 is shut off immediately, so that the rapid change of the magnetic flux density is produced in the ignition coil 114, whereby a high voltage pulse current appear in the secondary winding 114B of the ignition coil 114. This high voltage pulse current is supplied to the discharge electrode 112A. As the result of this supply, a spark discharge is produced in the spark gap 112.

On the other hand, in the low voltage electric source device L1 supplying the direct current, the electric power from the direct current source such as the battery 117 is stored in the capacitor 119 as an electric charge. The voltage of the source 117 is so selected that the electric arc discharge does not generate in the spark gap 112.

In the spark gap 112, a breaking of insulation between the electrodes 112A and 112B takes place as the result of supplying the high voltage current pulse generated by the high voltage electric source device H to the spark gap 112. At the same time as the said breaking of insulation, the electric current of a large amount flows from the high voltage electric source to the spark gap instantaneously. As soon as this electric discharge of the electric current of large amount takes place in the discharge gap, the discharge voltage lowers. In general, an initial discharge i.e. the spark discharge needs a high voltage, but the discharge following the initial discharge does not need such the high voltage. When the lowering or drop of the discharge voltage takes place as described above, this voltage drop operates as a trigger by which the electric charge stored in the capacitor 119 can be discharged while its voltage is so low as to not generate the initial discharge between the electrodes 112A and 112B. Thus, the discharge having an energy corresponding to the capacity of the capacitor 119 generates in the low voltage condition for a time established by the capacitor. When the discharge of the electric charge stored in the capacitor 119 is carried out for the specified period, as a matter of course the voltage between the electrodes 119A and 119B of the capacitor 119 drops down. This lowering of voltage results stopping of the discharge in the spark gap 112.

After the capacitor 119 loses its electric charge, the charge to the capacitor 119 is carried out again in accordance with the time constant defined by the resistance value of the resistor 118. The charge stored in the capacitor 119 by the charging operation is discharged again by the breaking of insulation between the electrodes 112A and 112B due to the high voltage pulse supplied from the high voltage electric source device H.

According to the circuit construction shown in FIG. 4, the electric arc discharge continueing for a specified period due to the discharge of the capacitor 119 can be carried out in the spark gap (between the electrodes of the ignition plug in usual). The air-fuel mixture is ignited and supplied a large energy by this arc discharge, so that desired combustion can be obtained even when the lean mixture is used or the temperature of an engine is low.

Figure 5:
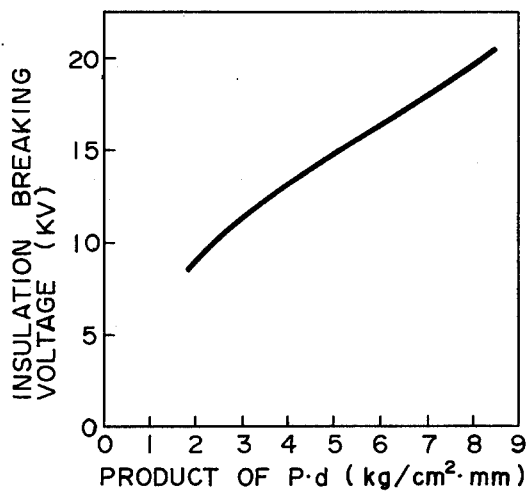
FIG. 5 is a diagram showing the variation of an insulation breaking voltage to the product of the distance of the discharge gap and the pressure of a spark discharge atmosphere.
Figure 6:
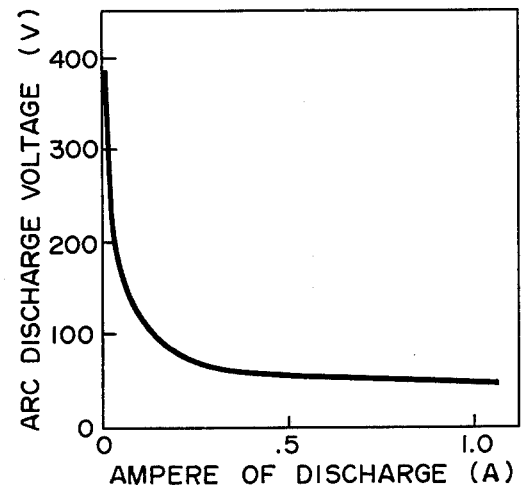
FIG. 6 is a diagram showing the relationship between an electric discharge voltage and an electric discharge current.

The functional effects of the electric source apparatus shown in FIG. 4 will become clear from FIGS. 5 and 6. FIG. 5 shows the relationship between the voltage amount for breaking the insulation and the product of the distance $d$ of the spark gap by the pressure $p$ of the atmosphere of spark gap. In usual ignition plugs, the product of $d$ by $p$ is about 2 to 8, so that in order to produce a spark discharge in the spark gap of the usual ignition plug, high voltages of 8 to 20 kV are necessary.

FIG. 6 shows the relationship between the voltage and the ampere of continuous discharge current. As understood from the diagram shown in FIG. 6, in the case of the discharge ampere less than b 0.2A, the necessary voltage increases hardly. In the prior ignition apparatus, the discharge current is about 30 to 50 mA, so that the voltage necessary for the continuous discharge needs 600 to 1,500 V. If the discharge current is more than 0.5A, the voltage necessary for the continuous discharge may be less than b 100V.

As clear from the above mentioned explanation, as soon as the insulation breaking occurs, the voltage necessary for the continuous discharge following this insulation breaking phenomena may be less than 100V in the case of the current of the continuous discharge being more than 0.5A. When the current is more than 0.5A, the continuous arc discharge can be obtained in the very low voltage less than 100V.

Figure 7:
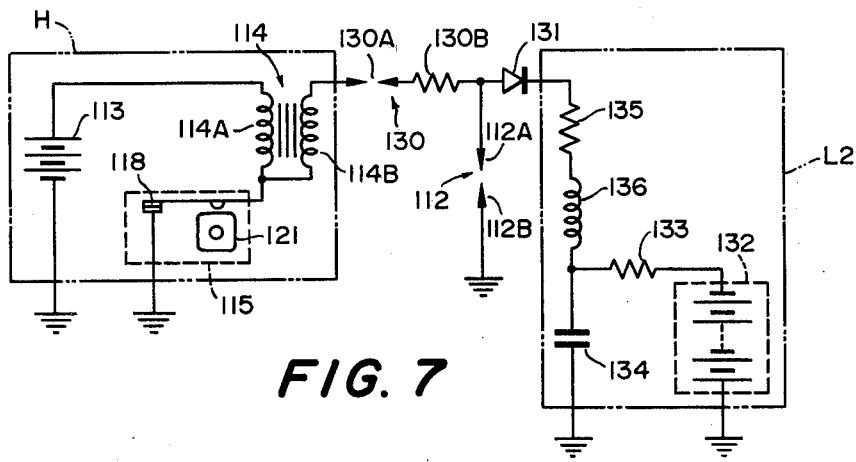
FIG. 7 is an electric circuit diagram showing another embodiment of the igniting electric source apparatus of the present invention.

In FIG. 7, the other embodiment of the igniting electric source appartus according to the present invention is shown. Also in this embodiment, the high voltage electric source device H and a low voltage electric source device L2 are connected to the spark gap 112 in parallel. In respective devices H and L2, breakers 130 and 131 for preventing the counter current flow between them are provided. The breaker 131 is a rectifier same as in the embodiment shown in FIG. 4. Another breaker 130 consists of a discharge gap 130A and a resistor 130B. The high voltage electric source device H is quite same as the device shown in FIG. 4 and therefore the same numeral references as those in FIG. 4 are used for the same components. The construction and function of the high voltage electric source device H shown in FIG. 7 are quite same as those shown in FIG. 4.

In the low voltage electric source device L2 shown in FIG. 7, the negative electrode of an electric source a battery 132 is connected to a resistor 133 and a capacitor 134 in series. The negative electrodes of these source 132 and condenser 133 are earthed. This construction is same as that of the device L1 in FIG. 4 but in the embodiment as shown in FIG. 7, further, a resistor 135 and an inductance 136 are connected to the discharge gap 112 through the rectifier 131 and the capacitor 134 in series to control the continuous discharge current flowing from the device L2 to the spark gap 112. The continuous discharge current is fixed by the impedance due to the resistor 135 and the inductance 136.

Also in the embodiment shown in FIG. 7, the high voltage pulse current generated by the high voltage electric source device H causes a spark discharge at the discharge gap 130A which is provided for preventing a counter current from the device L2 and generates a spark discharge at the spark gap 112. The distance between the electrodes of the counter current breaker 130 i.e. the length of the discharge gap 130A is predetermined so as to allow passing of the current pulse from the device H and so as not to allow passing the counter current of a low voltage from the device L2. The spark discharge once generates at the spark gap 112, the electric charge stored in the capacitor 134 of the device L2 is discharged by the trigger effect of the said spark discharge, as aforesaid. In this case, the discharge current from the condenser 134 is controlled by the resistor 135 and the inductance 136. Also according to the embodiment shown in FIG. 7, the discharge due to the device H is followed by the continuous discharge of the capacitor 134.

In order to prevent the fact that the current from the device L2 flows into the device H as a counter current, the discharge gap 130A is provided in the embodiment shown FIG. 7. This discharge gap 130A can be substituted by the rectifier used in the embodiment shown in FIG. 4. Of course, an impedance generated by the discharge gap 130A and the resistor 130B exists. In the discharge gap 112, when the insulation breaking takes place, the impedance of the spark gap 112 is very high. If the impedance due to the discharge gap 130A and the resistor 130B is selected in a low value relatively to the impedance of the spark gap 112, the former impedance can be ignored for the discharge current from the device H. The high voltage output generated in the device H has a character of pulse and the duration of the pulse is very short, so that this output pulse from the device H can be prevented by also the inductance 136 to enter the capacitor 134 and the battery 132.

As described hereinbefore, in the igniting apparatus for an internal combustion engine according to the present invention, the first spark discharge for an ignition and the second continuous electric discharge following the first discharge can be obtained and therefore the large energy can be supplied to the air-fuel mixture intaken into the cylinder, whereby good ignitability is ensured.

We claim:
1. An ignition apparatus for internal combustion engines comprising:

a main combustion chamber connected to receive a lean fuel mixture;

an auxiliary combustion chamber dimensioned to receive a lean mixture from said main combustion chamber;

a communicating opening for inter-connecting said auxiliary and main combustion chambers wtih each other;

a spark generating means located close to and forming a spark gap at said communicating opening; and an igniting electric source means for generating an electric discharge spark in the spark gap to ignite the lean mixture within said auxiliary combustion chamber and to supply energy to the combustion gas when said combustion gas is passing through said communicating opening;

said igniting electric source means including a high voltage electric source device comprising an electric source, an ignition coil connected to said electric source and a contact breaker connected in series to a primary winding of said ignition coil to feed an initial high voltage surge to said spark gap, and a low voltage electric source device comprising a second electric source, a capacitor connected to said second electric source through a first resistor forming a charging path and a second resistor connected to said capacitor to form a discharging path and to determine a discharging time constant; said capacitor having a capacity of a value sufficient to maintain the electric discharge generated in said spark gap by said high voltage electric source device until the time when the combustion gas generated within said auxiliary combustion chamber passes through said communicating opening, these said electric source devices being connected to said spark gap in parallel to each other through reverse current breakers respectively for preventing a current leakage occurring between both said electric source devices.

2. An igniting apparatus for internal combustion engines according to claim 1, wherein one of said reverse current breakers is connected to the interconnecting point of the first resistor and capacitor through an impedance means consisting of the second resistor and an inductance.

3. An ignition apparatus for internal combustion engines according to claim 1, in which said spark generating means comprises an ignition plug having a central electrode, said ignition plug being detachably mounted in the upper portion of the auxiliary combustion chamber, said cnetral electrode extending downward and vertically to a position close to the communicating opening to form the spark gap between the lower end portion of the central electrode and the inner circumferential portion of the communicating opening.

4. An ignition appartus for internal combustion engines according to claim 1, wherein the said auxiliary combustion chamber is provided by an ignition plug mounted detachably in a cylinder head, which ignition plug comprises a hollow part forming the auxiliary combustion chamber, a communicating opening formed at the bottom portion of the hollow part and a central electrode fixed in the hollow portion, of which the lower end portion is positioned in close to the communicating opening to form the spark gap between the lower end portion and the inner circumferential portion of the communicating opening, The central electrode being connected to the igniting electric source apparatus to generate an electric discharge arc at the spark gap.

5. An igniting apparatus for internal combustion engines according to claim 1, wherein the reverse current breakers are rectifiers.

6. An igniting apparatus for internal combustion engines according to claim 1, wherein the reverse current breaker in the high voltage electric source device is interposed between the spark gap and the said high voltage electric source device and consists of an electric discharge gap and another resistor connected in series to each other.

* * * * *